US005537227A

United States Patent [19]

Samii et al.

[11] Patent Number: 5,537,227

[45] Date of Patent: Jul. 16, 1996

[54] PAPER PICKING AND SEPARATOR SYSTEM FOR FACSMILE OR COPY MACHINE

[75] Inventors: Morad M. Samii, Poway; Chuong C. Ta, San Diego, both of Calif.

[73] Assignee: Hewlett-Packard Company, Palo Alto, Calif.

[21] Appl. No.: 324,288

[22] Filed: Oct. 14, 1994

[51] Int. Cl.$^{6}$ .................................................... H04N 1/04

[52] U.S. Cl. ......................... 358/498; 358/400; 358/401; 271/121; 271/125

[58] Field of Search .................................... 358/401, 498, 358/496, 296, 501, 400, 471; 271/121, 122, 124, 125, 10.11

[56] References Cited

U.S. PATENT DOCUMENTS

| | | | |
|---|---|---|---|
| 4,015,839 | 4/1977 | McKee | 271/37 |
| 4,457,507 | 7/1984 | Ishikawa et al. | 271/121 |
| 4,568,074 | 2/1986 | Murayoshi | 271/121 |
| 4,674,737 | 6/1987 | Murayoshi | 271/124 |
| 4,861,013 | 8/1989 | Shibata et al. | 271/121 |
| 4,887,806 | 12/1989 | Tanaka et al. | 271/121 |
| 5,052,676 | 10/1991 | Shiina et al. | 271/121 |
| 5,186,448 | 2/1993 | Ohsawa et al. | 271/121 |
| 5,211,388 | 5/1993 | Walluk | 271/122 |
| 5,273,267 | 12/1993 | Neugebauer | 271/121 |
| 5,277,416 | 1/1994 | Kim | 271/121 |
| 5,316,285 | 5/1994 | Olson et al. | 271/121 |
| 5,318,287 | 6/1994 | Okayama | 271/121 |
| 5,364,195 | 11/1994 | Kanemitsu et al. | 271/121 |
| 5,370,379 | 12/1994 | Wyer | 271/121 |
| 5,370,380 | 12/1994 | Suzuki et al. | 271/121 |
| 5,372,359 | 12/1994 | Miura et al. | 271/121 |
| 5,374,047 | 12/1994 | Tsukamoto et al. | 271/121 |
| 5,374,048 | 12/1994 | Takahashi | 271/121 |
| 5,411,247 | 5/1995 | Ohsawa | 271/121 |

FOREIGN PATENT DOCUMENTS

| | | |
|---|---|---|
| 2588538 | 4/1987 | France . |
| 57-180540 | 11/1982 | Japan . |
| 58-113048 | 7/1983 | Japan . |
| 60-97138 | 5/1985 | Japan . |
| 60-178136 | 9/1985 | Japan . |
| 60-244734 | 12/1985 | Japan . |

*Primary Examiner*—Edward L. Coles, Sr.
*Assistant Examiner*—Fan Lee

[57] ABSTRACT

A facsimile machine containing an improved paper separator system is described where, instead of a symmetrical, cylindrical paper-feed roller, an asymmetrical feed roller (or stripper roller) is used to separate a bottommost sheet from a stack of sheets. Eccentric portions of the feed roller are located at both ends of the roller, and the middle portion of the roller is cylindrical. Paper-feed springs oppose the eccentric portions of the feed roller, while a centrally located separator pad opposes the cylindrical middle portion of the feed roller. The extended radius at the apogee of the eccentric portions allows the eccentric portions to effectively reach out and grab the bottommost sheet even if the stack of sheets were only initially lightly contacting the roller. The eccentric portions of the feed roller also provide surges in the frictional force urging the bottommost sheets toward the separator pad. This surge in force acts to spread out (or pre-separate) the paper in the stack so the paper can be more easily separated by the separator pad.

21 Claims, 6 Drawing Sheets

PAPER PICKING AND SEPARATOR SYSTEM FOR FACSMILE OR COPY MACHINE

FIELD OF THE INVENTION

This invention relates to feed mechanisms for a facsimile machine, copy machine, printer, or other machine which requires paper to be advanced one sheet at a time.

BACKGROUND OF THE INVENTION

A typical facsimile machine or copy machine can receive a stack of paper sheets for reading or copying and automatically feed one sheet at a time from the stack for further processing by the machine. One well known paper separation technique uses a single paper-feed roller made of rubber or other high-friction material. One or more paper-feed springs (usually a leaf spring) opposes the roller. When a stack of paper is properly placed into a paper tray, the edge of the stack of paper is wedged between the high friction roller and the paper-feed springs. When the roller begins turning, while the paper-feed springs press the stack of paper against the roller, the bottommost sheets will be forwarded by action of the roller while the top sheets will be generally restrained by the angle of the paper-feed springs. Frequently, two or more sheets of paper are forwarded beyond the paper-feed springs and must be separated from one another.

In order to separate these two or more sheets from one another and only forward the bottom sheet, a separator pad formed of rubber is located downstream from the paper-feed springs. A separator spring biases the separator pad against the paper-feed roller or against a downstream roller. A downward force of the separator pad against the top sheets now frictionally grips these top sheets. The greater frictional force provided by the paper-feed roller against the bottom sheet now causes only the bottom sheet to be forwarded beyond the separation pad for further processing.

Examples of such techniques are described in U.S. Pat. Nos. 4,887,806 and 4,674,737.

The high-friction paper-feed rollers used in these types of devices are cylindrical with no perceptible asymmetry so as to provide a relatively constant forwarding force to the paper sheets.

Despite extensive experimentation and optimization of design, these prior art paper separation systems are still subject to malfunctions where two or more sheets of paper at a time are forwarded beyond the separation pad. One reason for such malfunctions is that the various users of the facsimile or copy machine insert the stack of sheets against the paper-feed roller with varying forces. This affects the initial friction between the roller and the bottom sheets, as well as the friction between the sheets themselves. Another reason for such malfunctions is due to the varying characteristics of the paper itself stemming from humidity, paper smoothness, and other obvious factors which affect the amount of force needed to separate one sheet of paper from another sheet of paper.

What is needed is an improved structure and technique for automatically separating a bottom or top sheet of paper from a stack of paper inserted into a facsimile machine, a copy machine, or the like. It would also be extremely advantageous that this structure easily replace existing structures in such machines to improve the paper separation capability of these machines at a minimum of cost.

SUMMARY

An improved paper separator system is described for use in any machine in which the user inserts a stack of paper in the machine and the machine is required to feed one sheet at a time for further processing. In the preferred embodiment, instead of a symmetrical, cylindrical paper-feed roller, an asymmetrical feed roller (or stripper roller) is used. Eccentric portions of the feed roller are located at both ends of the roller, and the middle portion of the roller is cylindrical.

Paper-feed springs oppose the eccentric portions of the feed roller, while a centrally located separator pad opposes the cylindrical middle portion of the feed roller.

The extended radius at the apogee of the eccentric portions allows the eccentric portions to effectively reach out and grab the bottommost sheet even if the stack of paper were only initially lightly contacting the roller. This action compensates for the varying degrees of insertion force by the various users when inserting the paper stack into the machine.

The eccentric portions of the feed roller also provide surges in the frictional force urging the bottommost sheets toward the separator pad. This surge in force acts to spread out (or pre-separate) the paper in the stack so the paper can be more easily separated by the separator pad.

Other advantages also result from the use of this asymmetrical roller.

This paper-feed roller embodiment can easily be formed to replace paper-feed rollers on existing machines. A simple and inexpensive method for forming the asymmetrical paper-feed roller is also described.

DETAILED DESCRIPTION OF THE PREFERRED EMBODIMENTS

Figure 1:
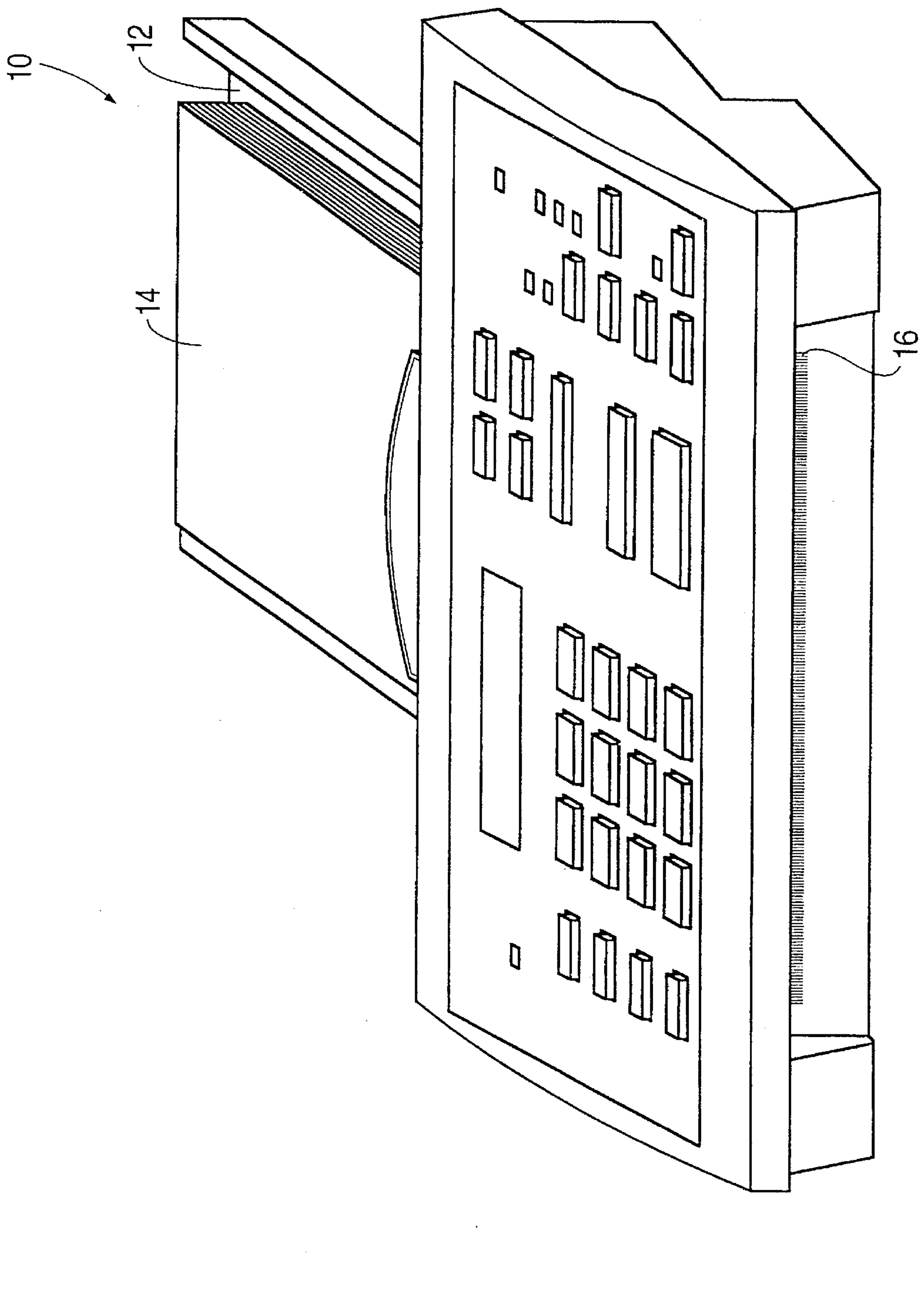
FIG. 1 is a top perspective view of a facsimile machine incorporating the preferred stripper roller assembly.

FIG. 1 is a front perspective view of a facsimile machine 10 incorporating the preferred embodiment paper separator mechanism. Facsimile machine 10 contains a paper tray 12 which is downward directed so that a paper stack 14 placed into tray 12 is urged toward the receiving portion of machine 10 by gravity. The paper stack 14 enters a slot in the back of machine 10.

A paper separation mechanism within machine 10 pulls one sheet of paper at a time from the bottom of the stack 14 so that printing on the sheet may be read and subsequently transmitted by the facsimile machine 10 in a well known manner. The sheet may also be copied by machine 10. In another embodiment, machine 10 is a printer which feeds in blank sheets of paper for printing thereon. The individual sheets of paper are then outputted through exit slot 16.

A printing mechanism (not shown) is also provided in the complete machine 10 for printing received facsimile transmissions. The printing mechanism, which may be an inkjet or laser printer, can also be used when machine 10 is used as a copier or printer.

Figure 2:
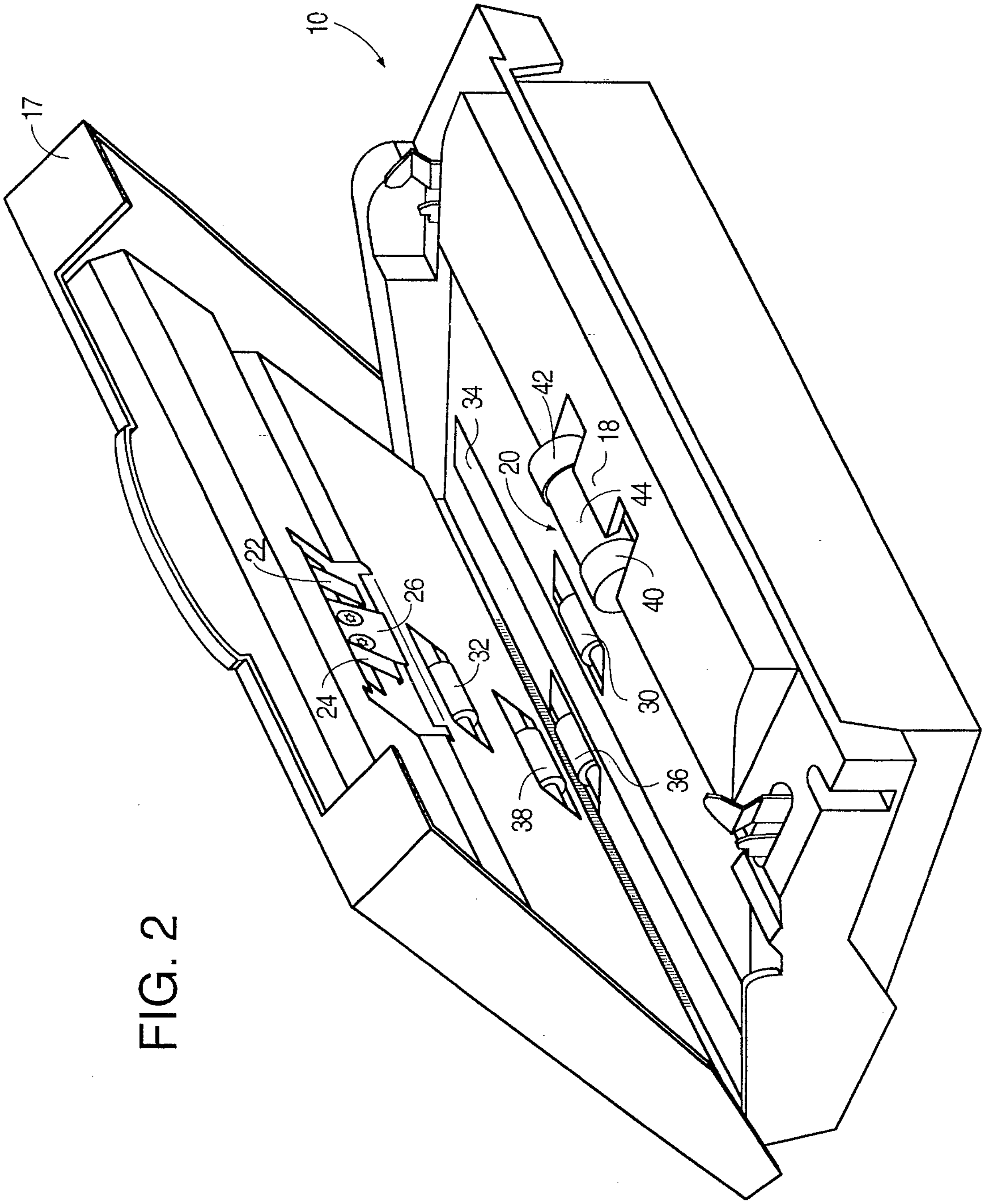
FIG. 2 is a back perspective view of the machine of FIG. 1 with its cover opened.

FIG. 2 is a back perspective view of the facsimile machine 10 with its hinged top portion 17 lifted up to reveal the paper separation and paper transport mechanisms. Paper feed tray 12 has been removed in FIG. 2 for simplicity. When top portion 17 is in its closed position, shown in FIG. 1, and paper stack 14 is placed in paper tray 12, the front edge of the stack extending over shelf 18 abuts against a rubber stripper roller 20, and paper-feed springs 22 and 24 provide a downward force on paper stack 14.

When stripper roller 20 rotates, the frictional force between roller 20 and the bottom sheet, and the frictional forces between the bottom sheet and the overlying sheets, pull the paper sheets further into machine 10. A rubber separator pad 26, biased downward by a separator spring 27 (shown in FIG. 5 but obscured in FIG. 2), effectively blocks all sheets but the bottom sheet so that only the bottom sheet directly contacted by the rubber stripper roller 20 is forwarded past separator pad 26.

In one embodiment the average forwarding speed of stripper roller 20 is about 12 mm/sec.

A downstream, rubber main feed roller 30 is rotated so as to have a faster paper forwarding speed (e.g., 26 mm/sec.) than stripper roller 20. Thus, when the bottom sheet of paper is sufficiently forwarded by stripper roller 20 to be between main feed roller 30 and an opposing passive roller 32, the bottom sheet will be pulled by main feed roller 30 (rather than pushed by stripper roller 20) to ensure that the paper speed is constant and correct across window 34 or any printing mechanism. Stripper roller 20 is driven via a slip clutch, which allows stripper roller 20 to rotate at the increased forwarding speed of main feed roller 30 when a single sheet of paper simultaneously contacts both rollers 20 and 30.

Main feed roller 30 forwards the paper over a window 34, below which resides the necessary optical detection electronics for detecting the printing on the bottom sheet. Such optical electronics can be conventional and will not be described in detail herein. If machine 10 were solely a printer, window 34 and the optical electronics may be replaced by a printing mechanism.

A kick-out roller 36, in conjunction with a passive opposing roller 38, has a 2% faster forwarding speed than main feed roller 30 to ensure that there is no slack in the paper between rollers 30 and 36. The pulling force of main feed roller 30 is approximately 3 pounds, while the pulling force of kick-out roller 36 is approximately 1.5 pounds, so the speed of the paper is controlled by main feed roller 30 rather than kick-out roller 36.

A single stepper motor drives each of the rollers 20, 30, and 36, and conventional gear mechanisms and slip clutch mechanisms are used for driving rollers 20, 30, and 36 at the required rotational speeds and forces.

The users of the facsimile machine 10, when placing the paper stack 14 in position on tray 12, will insert the stack 14 into machine 10 with varying amounts of force depending upon what tactile feedback the user believes is required to indicate a proper positioning of the stack. If the expected tactile feedback force is very light, then no sheets may be grabbed by the rotating stripper roller 20, since there is insufficient friction between roller 20 and the bottom sheet. If the user expects a high degree of tactile feedback, the stack 14 will be wedged deeply between stripper roller 20 and the opposing springs 22, 24, and 27, thus possibly causing multiple sheets to be simultaneously forwarded downstream by stripper roller 20.

The below-described stripper roller 20 and opposing spring assembly (comprising springs 22, 24, and 27 and separator pad 26) improve the separating function of the stripper mechanism to compensate for the varying forces initially exerted on the paper stack 14 when the user inserts the stack 14 into machine 10.

Figure 3:
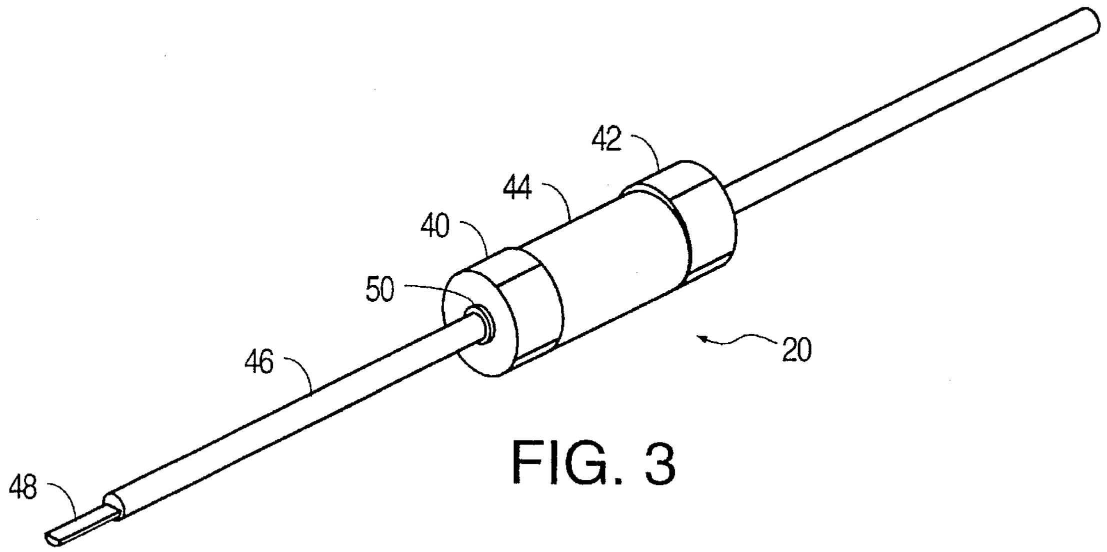
FIG. 3 is the preferred embodiment of the stripper roller assembly.

FIG. 3 is a perspective view of the preferred embodiment stripper roller 20. Stripper roller 20 includes eccentric kicker portions 40 and 42 located at the ends of the cylindrical middle portion 44 (also identified in FIG. 2). Stripper roller 20 is forcedly slipped over a stainless steel shaft 46 and is frictionally secured to shaft 46. Shaft 46 includes a flattened end 48 which is ultimately secured to a suitable slip clutch and gear mechanism within facsimile machine 10 for rotating stripper roller 20. A molded plastic shim 50 is attached to shaft 46 and includes an extension which is inserted under kicker portion 40 to create the eccentricity of kicker portion 40. An identical shim 51 (shown in FIG. 4) is used to create the eccentricity of kicker portion 42.

Figure 4:
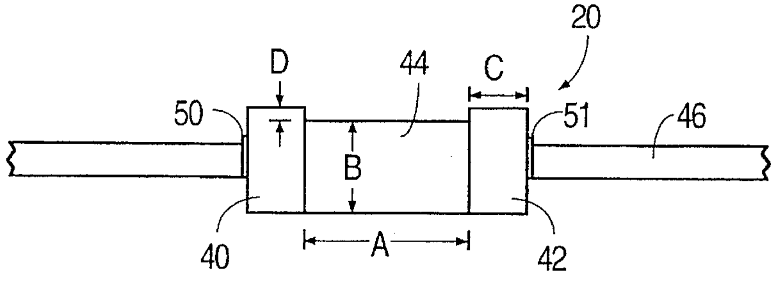
FIG. 4 is a front elevational view of the stripper roller of FIG. 3.

The preferred embodiment dimensions of stripper roller 20 are identified with respect to FIG. 4 and are as follows: The width A of middle portion 44 is approximately 29 mm; the diameter B of middle portion 44 is approximately 19 mm; the width C of each kicker portion 40 and 42 is approximately 8 mm; the distance D, measuring the eccentricity of kicker portions 40 and 42, is approximately 1.5 mm; and the length of shaft 46 is approximately 27.5 cm. The value of D may range from anywhere between 1.0 mm to 2.5 mm while still achieving the improved paper separation results described below. As D exceeds 2.5 mm, the downward spring pressure exhibited by paper-feed springs 22 and 24 in FIG. 2 on kicker portions 40 and 42 becomes too great, and the restraining force of separator pad 26 may be insufficient to stop two or more paper sheets from being simultaneously forwarded downstream by roller 20.

The dimensions A–C may, of course, be larger or smaller depending upon a particular application. For example, the radius of the middle portion 44 and the maximum radius of kicker portions 40 and 42 may range from 5 mm to 30 mm. When a larger stripper roller is used, the dimension D may also be increased. Experimentation may be used to obtain the optimum value of D.

Figure 5:
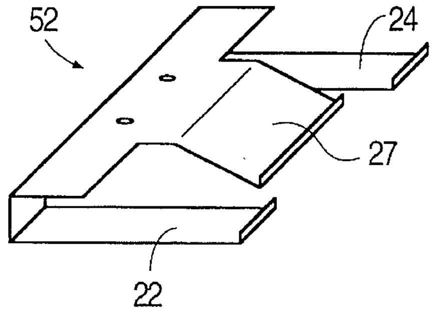
FIG. 5 is a perspective view of the preferred embodiment spring structure.
Figure 6:
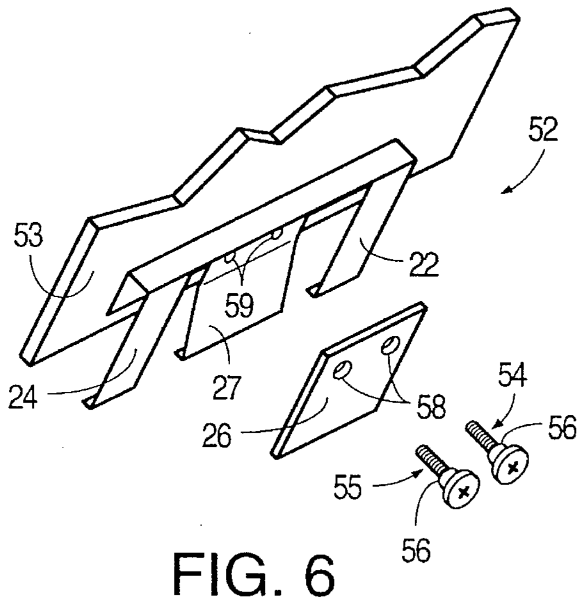
FIG. 6 is a magnified exploded view of the spring structure and separation pad assembly shown in FIG. 2.

FIGS. 5 and 6 illustrate in more detail the spring assembly 52, comprising paper-feed springs 22 and 24 and separator spring 27. Spring assembly 52 is stamped from a single piece of sheet steel and formed using conventional fabrication methods. Spring assembly 52 is secured to the metal frame 53 (only a portion of frame 53 is shown) in the top portion 17 (shown in FIG. 2) of machine 10 using screws 54 and 55. Screws 54 and 55 also secure separator pad 26 to spring assembly 52 but do not squeeze the rubber separator pad 26. Thus, optimum separator characteristics of separator pad 26 are maintained despite the varying torque placed on screws 54 and 55 to secure assembly 52 to frame 53. This is accomplished by screws 54 and 55 having a sleeve portion 56 which extends through holes 58 in separator pad 26 and which directly contacts the metal spring assembly 52. Holes 59 in the metal spring assembly are smaller than holes 58. Thus, resistance to further turning of screws 54 and 55 is due to sleeves 56 opposing spring assembly 52 and not due to the heads of screws 54 and 55 opposing rubber separator pad 26.

Prior art separation pads such as shown in U.S. Pat. No. 4,887,806 to Tanaka appear to simply sandwich the rubber separator pad between the screw heads and the frame itself, thus distorting the separator pad as the screws are torqued to secure the spring assembly to the frame. The embodiment of FIG. 6 eliminates such fabrication variances and results in more reliable paper separation.

Spring assembly 52 itself has other advantages. By using an integral structure, spring assembly 52 is easy to handle, and springs 22, 24, and 27 are pre-aligned. Further, the spring characteristics of paper-feed springs 22 and 24 can be made independent of the spring characteristics of separator spring 27 since the lengths and widths of springs 22, 24, and 27 are independently selectable. The spring assembly 52 is also extremely compact since paper-feed springs 22 and 24 extend the entire length of spring assembly 52.

Other, less efficient, spring structures may also be used, such as those described in the prior art.

Figure 7:
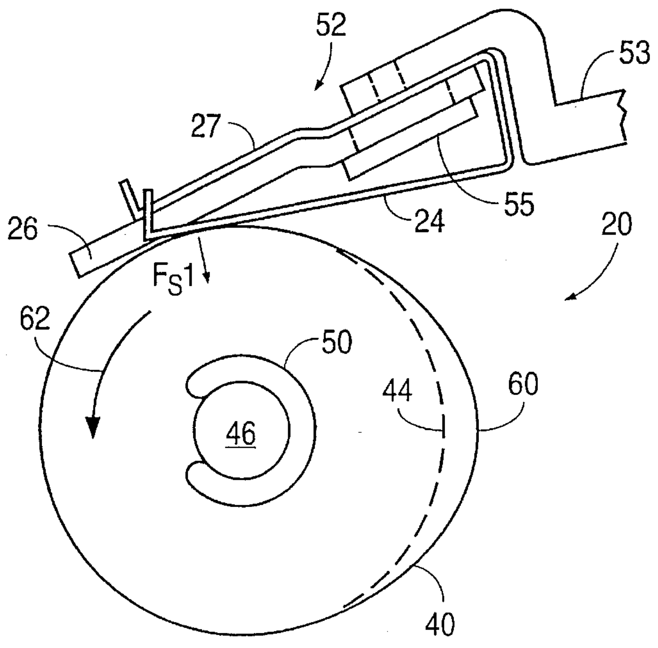
FIGS. 7 and 8 are side views of the stripper roller assembly interacting with the spring assembly of FIG. 6.

FIG. 7 is an elevated side view of stripper roller 20 in FIG. 2 when top portion 17 is in its closed position shown in FIG. 1. The eccentric kicker portion 40 is shown in solid outline, with the obscured cylindrical middle portion 44 shown in dashed lines. Shaft 46 and shim 50 are also shown. Paper-feed spring 24 opposes the surface of kicker portion 40, while rubber separator pad 26 opposes the cylindrical middle portion 44 with a downward pressure exerted by separator spring 27. Spring assembly 52 is attached to frame 53 using screws 54 and 55 as described with respect to FIG. 6. When paper-feed spring 24 is not riding over kicker portion 40 near the apex 60, there is a downward spring force $F_s1$ exerted by spring 24 on kicker portion 40. This force may be on the order of 31 grams ±6 grams. The downward spring force by separator spring 27 urging separator pad 26 against the cylindrical middle portion 44 is approximately 183 grams.

Figure 8:
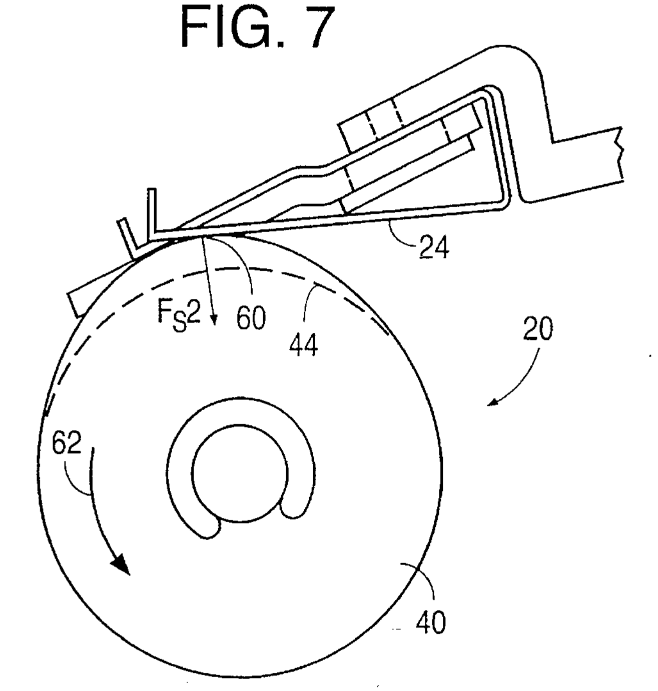

As stripper roller 20 rotates, as shown by arrow 62, and the apex 60 of kicker portion 40 forces paper-feed spring 24 upward, as shown in FIG. 8, an increased spring force $F_s2$ is now downwardly applied by spring 24. In one embodiment, $F_s2$ exhibits a downward force of approximately 10 grams greater than $F_s1$. When sheets of paper are interposed between spring 24 and kicker portion 40, the various forces exerted by paper-feed spring 24 on the paper sheets will of course exceed $F_s1$ and $F_s2$, but the difference between $F_s1$ and $F_s2$ will remain relatively the same.

Figure 9:
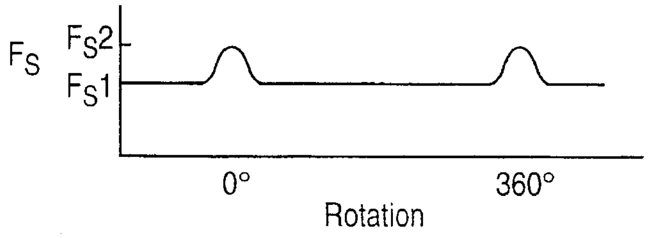
FIG. 9 illustrates the rotational angle versus downward force provided by the paper-feed springs on the kicker portions of the stripper roller.

FIG. 9 illustrates the force $F_s$ exerted by paper-feed spring 24 or 22 against the eccentric kicker portion 40 or 42 as stripper roller 20 rotates. At rotational angles 0° and 360°, the apex 60 (FIG. 8) directly opposes paper-feed springs 22 and 24.

The paper feed springs and the separator spring need not be leaf springs but may be any resilient means providing an opposing force against kicker portions 40 and 42 or middle portion 44.

Figure 10:
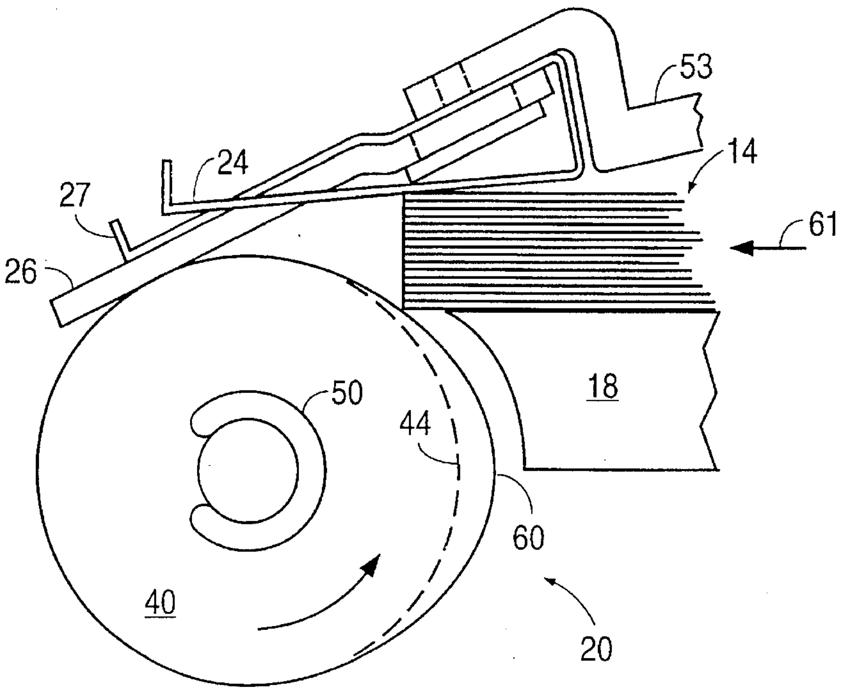
FIGS. 10 and 11 are side views of the stripper roller assembly illustrating the dynamic action of the stripper roller while pulling sheets of paper from a stack of paper into the machine for separating a bottom sheet of paper from the stack of papers.
Figure 11:
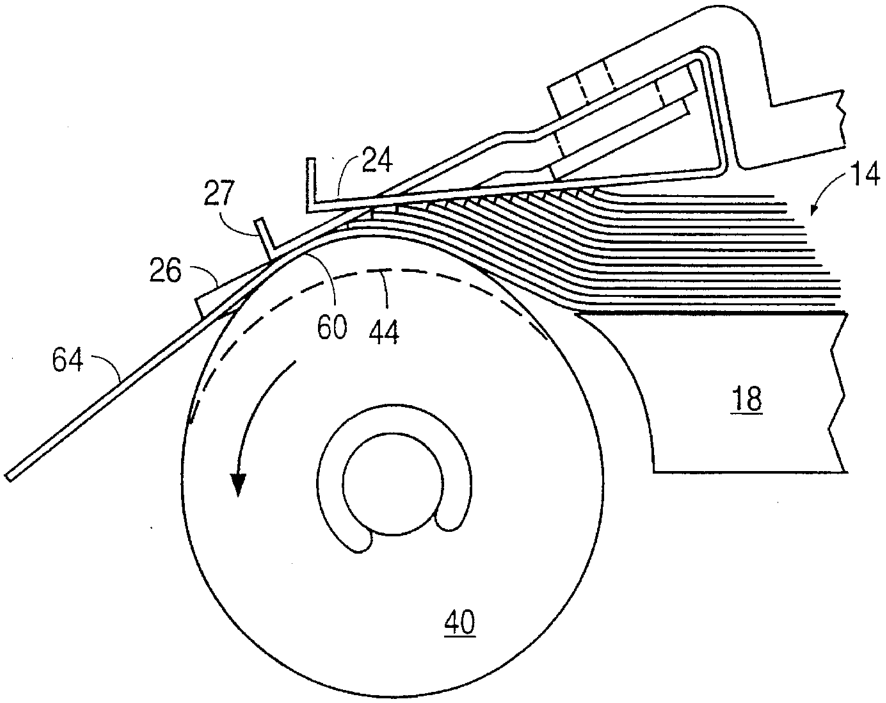
Figure 12:
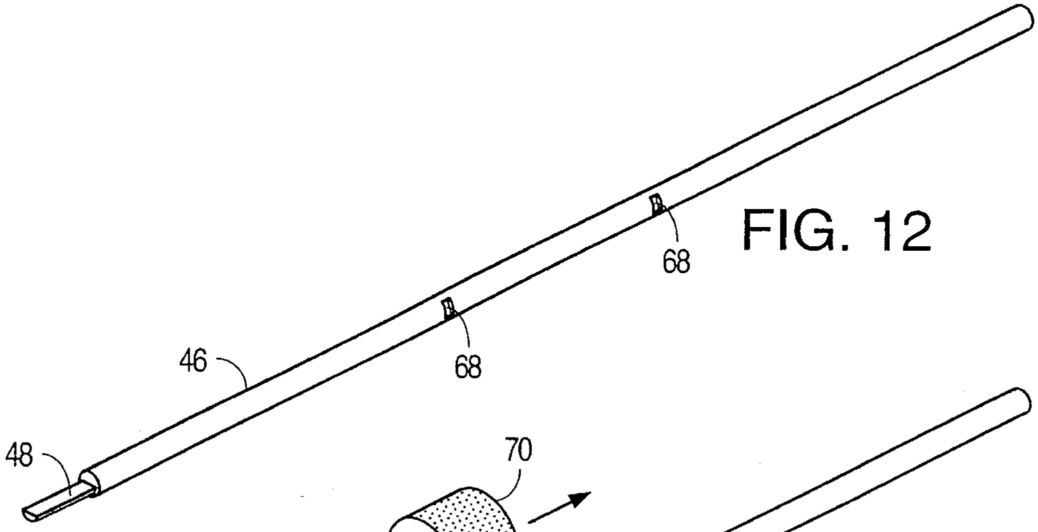
FIG. 12 illustrates the shaft upon which the stripper roller is mounted.

FIGS. 10 and 11 illustrate the operation of the eccentric kicker portions 40 and 42 as the apex 60 makes a first revolution after a paper stack 14 is inserted into the facsimile machine 10. In FIG. 10, a user inserts a paper stack 14 in the direction shown by arrow 61 between paper-feed springs 22/24 and kicker portions 40/42 of roller 20. The user senses the resistance to further insertion of the paper stack 14 and releases the paper stack 14. The actual extent to which the paper stack 14 is inserted between roller 20 and paper-feed springs 22/24 thus varies depending upon the user.

As the apex 60 is rotated toward the paper stack 14, the downward force applied by paper-feed springs 22/24 is thus increased (causing the friction between the kicker portions 40/42 and the bottom paper sheet to be increased). At the same time, the apex 60 of kicker portions 40/42 effectively reaches out to contact a greater bottom surface area of the bottom paper sheet so that the bottom sheet is pulled forward by the direct frictional contact with the kicker portions 40/42, while the other sheets are pulled forward with less force by their friction with this bottom sheet. The downward angle of paper-feed springs 22/24 causes the paper stack 14 to spread forward to resemble a staircase (FIG. 11), while the bottom sheet or bottom few sheets continue to be carried forward by the high friction between the kicker portions 40/42 and the bottom sheet.

FIG. 11 illustrates the position of stack 14 after being carried forward during the first rotation of stripper roller 20 at the point where apex 60 has now completed its function and advanced the bottom sheet 64 or bottom few sheets to be in contact with the rubber separator pad 26. During this next stage, the friction between the bottom sheet 64 and the rotating roller 20 continues to push the bottom sheet 64 out from under separator pad 26, while the sheets overlying this bottom sheet 64 are held back by contact with separator pad 26 and slip with respect to the bottom sheet 64.

After the bottom sheet 64 has exited from between separator pad 26 and stripper roller 20, the next sheet comes in direct contact with the rubber surface of the stripper roller 20 and is thus forced under the separator pad 26, while the separator pad 26, in conjunction with the angled paper-feed springs 22 and 24, hold back the remainder of the sheets.

Once the bottom sheet being passed under separator pad 26 reaches the main feed roller 30 shown in FIG. 2, then the main feed roller 30 controls the forwarding of the bottom sheet, as previously described with respect to FIG. 2.

Kicker portions 40 and 42 also create the advantage of allowing paper-feed springs 22 and 24 to have a low spring constant relative to that of the separator spring 27, since the momentarily high paper feeding force is brought about by the eccentricity of kicker portions 40 and 42 rather than by a high spring constant of springs 22 and 24. This is advantageous because a reduced downward pressure by the paper-feed springs 20 and 24 decreases the likelihood that multiple sheets will be forced across separator pad 26.

Thus, the rotation of kicker portions 40 and 42 draws the paper stack 14 into its ideal position shown in FIG. 11 so that any variance in the positioning of the stack 14 by the user will not adversely affect the separation function of roller 20 and separator pad 26.

Extensive testing conducted by the assignee has confirmed the improved performance of stripper roller 20 over conventional, symmetrical stripper rollers.

Figure 13:
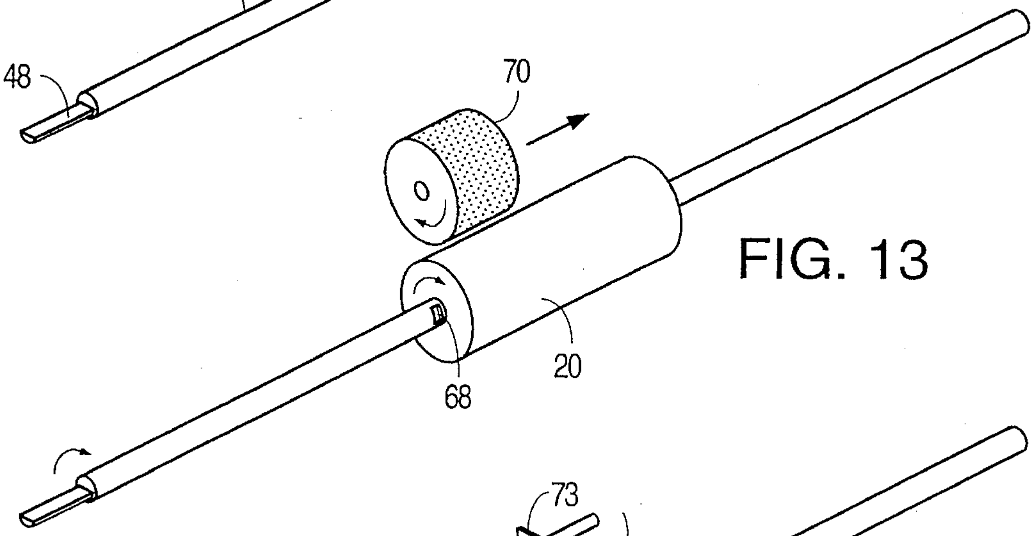
FIG. 13 illustrates the grinding process to form the stripper roller.
Figure 14:
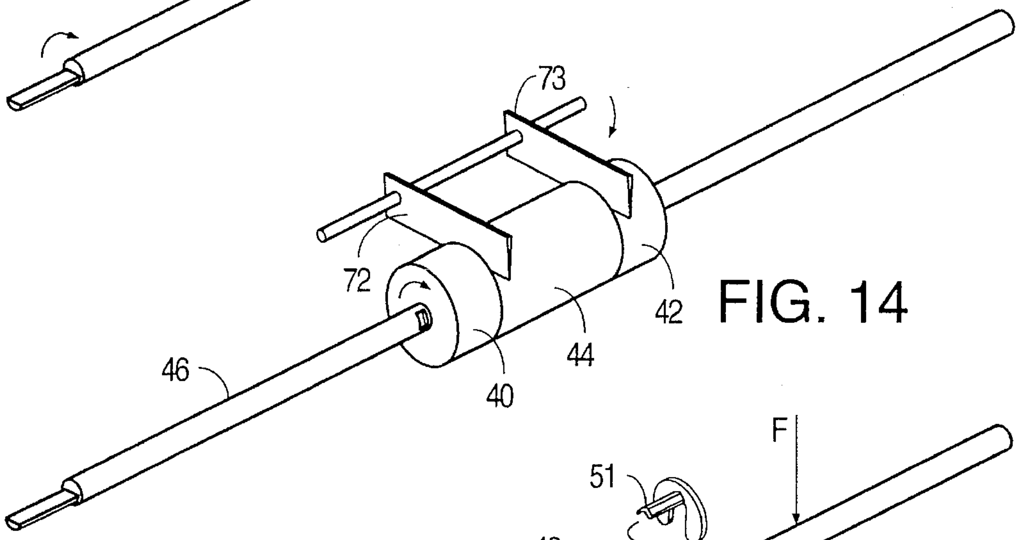
FIG. 14 illustrates the cutting process to separate kicker portions from the middle portion of the stripper roller.
Figure 15:
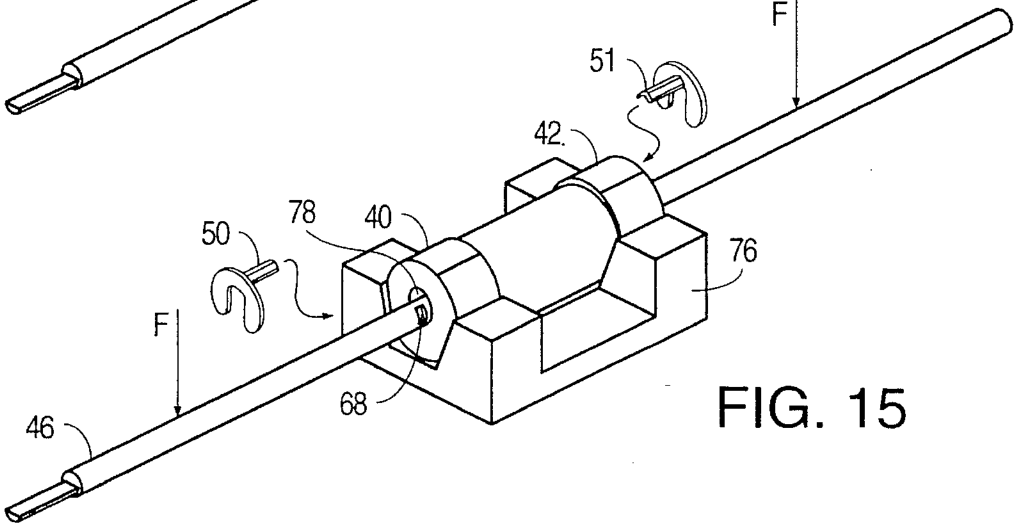
FIG. 15 illustrates a method for forming the eccentricity in the kicker portions.

FIGS. 12–15 illustrate a cost-effective way to manufacture the roller 20 and shaft 46 assembly. In a first step, an end 48 of stainless steel shaft 46 is ground to have a flat portion for enabling turning of shaft 46 and stripper roller 20 by the previously described gear mechanism and slip clutch assembly when installed in the facsimile machine 10. Notches 68 are also formed in shaft 46 using a grinding or broaching step. These notches 68 are for securing and aligning plastic shims 50 and 51 in place as shown in FIG. 15.

Rubber stripper roller 20 is initially formed, using injection molding, to be cylindrical as shown in FIG. 13. Shaft 46 is forcedly inserted through a central hole of roller 20 so that notches 68 are on either side of roller 20. Shaft 46 is then rotated on a lathe, and a counter-rotating abrasive grinding tool 70 is then moved across the width of the rotating roller 20 to cause roller 20 to have the desired diameter. This grinding also serves to slightly roughen the surface of roller 20 for increased friction with the paper surface.

When the grinding tool 70 is detected as having traversed the width of roller 20, knife blades 72 and 73, shown in FIG. 14, are then brought down on roller 20 to separate the kicker portions 40 and 42 from the middle portion 44. A mechanical stop prevents blades 72 and 73 from being forced against shaft 46. In the preferred embodiment, the grinding and slitting steps are performed automatically using automated machines whose general operation and construction would be readily understood by those skilled in the art.

The roller 20 and shaft 46 assembly is then removed from the lathe and placed in a fixture 76 having V-shaped supports for contacting kicker portions 40 and 42. A force F is then downwardly applied to both ends of shaft 46 to displace the kicker portions 40 and 42 upward with respect to shaft 46. This causes a gap 78 between shaft 46 and kicker portions 40 and 42 into which shims 50 and 51 are inserted. The U-shaped end portions of shims 50 and 51 slide over notches 68. When the force F is released from the ends of shaft 46, shims 50 and 51 are held in place by notches 68 and the downward pressure of kicker portions 40 and 42 on the shims. In the preferred embodiment, shims 50 and 51 create a 1.5 mm asymmetry in kicker portions 40 and 42.

The kicker portions 40 and 42 are now identical in all respects and, as a result, no skewing of the paper occurs.

The resulting stripper roller 20 and shaft 46 assembly (shown in FIG. 3) can be formed to any dimension to directly replace existing stripper roller assemblies using a single cylindrical roller.

Numerous and less efficient methods may also be employed to form the preferred embodiment stripper roller assembly. For example, asymmetrical kicker portions 40 and 42 may be molded separately from middle portion 44. Or, shaft 46 may be machined to include raised portions corresponding to where shims 50 and 51 in FIG. 15 are positioned. In these less preferred embodiments, shims 50 and 51 may be deleted. The various dimensions of each of the portions of the stripper roller may be adjusted as necessary for a particular application.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An apparatus which separates and forwards sheets one-by-one from a stack of sheets for optical detection of matter printed on said sheets, said apparatus comprising:

a holder for said stack of sheets;

a rotatable stripper roller located such that an edge of said stack of sheets in said holder abuts said stripper roller, said stripper roller having a cylindrical portion and a first eccentric portion, said first eccentric portion being oval shaped and having a maximum radius greater than a radius of said cylindrical portion, such that an outer surface portion of said first eccentric portion gradually extends beyond an outer surface of said cylindrical portion until reaching said maximum radius of said first eccentric portion;

a separator spring providing an opposing force against said cylindrical portion;

a feed spring providing an opposing force against said first eccentric portion, a rotation of said stripper roller causing fluctuations in said force supplied by said feed spring against said first eccentric portion while causing a substantially constant opposing force by said separator spring against said cylindrical portion, said stripper roller for being rotated so as to forward only one sheet, from said stack of sheets, downstream from said stripper roller for optical reading of printed matter on said sheet.

2. The apparatus of claim 1 wherein said apparatus is a facsimile machine.

3. The apparatus of claim 2 further comprising an optical detector located downstream from said stripper roller for detecting printed matter on said sheet.

4. The apparatus of claim 1 further comprising a separator pad positioned between said separator spring and said cylindrical portion of said stripper roller, said separator pad restraining all but said one sheet directly contacting said stripper roller so as to allow only said one sheet to be forwarded downstream from said stripper roller.

5. The apparatus of claim 1 further comprising a second eccentric portion, substantially identical to said first eccentric portion, said first eccentric portion being located at one end of said cylindrical portion and said second eccentric portion being located at another end of said cylindrical portion.

6. The apparatus of claim 1 further comprising:

a feed roller located downstream from said stripper roller and being rotated to have a faster paper sheet forwarding speed than said stripper roller.

7. The apparatus of claim 1 wherein said maximum radius of said first eccentric portion is greater than said radius of said cylindrical portion by at least approximately 1 mm.

8. The apparatus of claim 7 wherein said radius of said cylindrical portion is between approximately 5 mm and 30 mm.

9. The apparatus of claim 1 further comprising:

a shaft extending through said cylindrical portion and said first eccentric portion; and a shim inserted between said shaft and said eccentric portion for causing eccentricity in said eccentric portion.

10. The apparatus of claim 1 wherein said first eccentric portion has a major axis and a minor axis, said first eccentric portion having a first outer portion at one end of said major axis and a second outer portion at the other end of said major axis, wherein only said first outer portion extends beyond said outer surface of said cylindrical portion.

11. A method for separating one sheet from a stack of sheets comprising the steps of:

interposing a front edge of a stack of sheets between a paper feed spring and a stripper roller, said stripper roller having a cylindrical portion and an eccentric portion, said eccentric portion being oval shaped and having a maximum radius greater than a radius of said cylindrical portion, such that an outer surface portion of said eccentric portion gradually extends beyond an outer surface of said cylindrical portion until reaching said maximum radius of said eccentric portion;

rotating said stripper roller such that said outer surface portion of said eccentric portion which gradually extends beyond said outer surface of said cylindrical portion contacts said stack of sheets, said step of rotating said stripper roller causing one or more sheets from said stack to be forwarded by friction between said eccentric portion and said stack; and separating one sheet from said sheets forwarded by said stripper roller as said stripper roller rotates, said one sheet being the sheet directly contacted by said stripper roller as said stripper roller rotates.

12. The method of claim 11 wherein said step of separating comprises the step of blocking all sheets, except said one sheet directly contacting said stripper roller, by a resilient separation means opposing said cylindrical portion.

13. The method of claim 12 wherein said resilient separation means comprises a separator spring formed integral with said paper feed spring, and wherein said paper feed spring is longer than said separator spring.

14. The method of claim 11 wherein said eccentric portion comprises two eccentric rollers located on either side of said cylindrical portion, said eccentric rollers being substantially identical, wherein said paper feed spring comprises a paper feed spring opposing each of said eccentric rollers.

15. The method of claim 11 wherein said maximum radius of said eccentric portion is greater than said radius of said cylindrical portion by at least approximately 1 mm.

16. The method of claim 11 further comprising the step of detecting printing on said one sheet for converting said printing into electrical signals for transmission to a remote facsimile machine.

17. The method of claim 11 wherein said stripper roller is mounted on a shaft and said eccentric portion is formed by a shim inserted between said shaft and said eccentric portion.

18. The method of claim 11 wherein rotating said stripper roller causes a spring force generated by said paper feed spring on said stack to gradually increase as said outer surface portion of said eccentric portion which gradually extends beyond said outer surface of said cylindrical portion opposes said paper feed spring.

19. The method of claim 11 wherein said eccentric portion abuts said cylindrical portion.

20. The method of claim 11 wherein said eccentric portion has a major axis and a minor axis, said eccentric portion having a first outer portion at one end of said major axis and a second outer portion at the other end of said major axis, wherein only said first outer portion extends beyond said outer surface of said cylindrical portion.

21. A facsimile machine which separates and forwards sheets one-by-one from a stack of sheets for optical detection of matter printed on said sheets, said machine comprising:

a rotatable stripper roller located within said machine such that an edge of said stack of sheets abuts said stripper roller, said stripper roller having a cylindrical portion and a first eccentric portion, said first eccentric portion being oval shaped and having a maximum radius greater than a radius of said cylindrical portion, such that an outer surface portion of said first eccentric portion gradually extends beyond an outer surface of said cylindrical portion until reaching said maximum radius of said first eccentric portion, said stripper roller for being rotated so as to forward only one sheet, from said stack of sheets, downstream from said stripper roller for optical reading of printed matter on said sheet.

* * * * *